United States Patent
Li

(10) Patent No.: US 11,874,554 B2
(45) Date of Patent: Jan. 16, 2024

(54) DIFFUSION SHEET STRUCTURE

(71) Applicant: TCL CHINA STAR OPTOELECTRONICS TECHNOLOGY CO., LTD., Shenzhen (CN)

(72) Inventor: Qian Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 1077 days.

(21) Appl. No.: 16/619,099

(22) PCT Filed: Nov. 14, 2019

(86) PCT No.: PCT/CN2019/118374
§ 371 (c)(1),
(2) Date: Dec. 4, 2019

(87) PCT Pub. No.: WO2021/027159
PCT Pub. Date: Feb. 18, 2021

(65) Prior Publication Data
US 2021/0341791 A1 Nov. 4, 2021

(30) Foreign Application Priority Data
Aug. 14, 2019 (CN) .......................... 201910747746.1

(51) Int. Cl.
*G02F 1/13357* (2006.01)
*G02F 1/1335* (2006.01)
*G02B 5/02* (2006.01)

(52) U.S. Cl.
CPC ..... *G02F 1/133606* (2013.01); *G02B 5/0242* (2013.01); *G02B 5/0278* (2013.01);
(Continued)

(58) Field of Classification Search
CPC ......... G02F 1/133606; G02F 1/133628; G02F 1/133611; G02B 2207/101; G02B 5/0242; G02B 5/0278
See application file for complete search history.

(56) References Cited

U.S. PATENT DOCUMENTS

2007/0285785 A1* 12/2007 Lin ........................ G02B 5/045
 359/599
2007/0297168 A1 12/2007 Chang
(Continued)

FOREIGN PATENT DOCUMENTS

CN 101131442 A 2/2008
CN 103412356 A 11/2013
(Continued)

*Primary Examiner* — Matthew J. Peerce
(74) *Attorney, Agent, or Firm* — PV IP PC; Wei Te Chung; Zhigang Ma

(57) ABSTRACT

A diffusion sheet structure includes a transparent substrate and a diffusion film. The transparent substrate includes a first upper surface and a first lower surface. The diffusion film is disposed on the transparent substrate and includes a plurality of nano diffusion particles, and has a second upper surface and a second lower surface. The second lower surface is connected to the first upper surface. Janus material in a diffusion sheet is used in the present disclosure to replace diffusion particles of prior art, which not only retains original function of diffusing light, but also has excellent thermal conductivity, thereby improving thermal uniformity, making the liquid crystal display panel be heated uniformly, and reducing influence of temperature on liquid crystal material during lighting, thereby improving the problem of local area whitening.

12 Claims, 2 Drawing Sheets

(52) U.S. Cl.
CPC .. *G02F 1/133611* (2013.01); *G02F 1/133628* (2021.01); *G02B 2207/101* (2013.01)

(56) References Cited

U.S. PATENT DOCUMENTS

| | | | |
|---|---|---|---|
| 2014/0355122 A1 | 12/2014 | Wang | |
| 2015/0176797 A1* | 6/2015 | Inoue | H10K 50/858 |
| | | | 359/599 |
| 2016/0103254 A1* | 4/2016 | Dai | G02B 6/0051 |
| | | | 427/372.2 |
| 2022/0244448 A1* | 8/2022 | Fujii | G02B 5/02 |

FOREIGN PATENT DOCUMENTS

| | | |
|---|---|---|
| CN | 105444120 A | 3/2016 |
| CN | 105572774 A | 5/2016 |
| CN | 205982698 U | 2/2017 |
| CN | 106597737 A | 4/2017 |
| CN | 107356995 A | 11/2017 |
| CN | 108897082 A | 11/2018 |
| CN | 208477134 U | 2/2019 |

\* cited by examiner

US 11,874,554 B2

DIFFUSION SHEET STRUCTURE

FIELD OF INVENTION

The present disclosure relates to the field of display technology, and particularly relates to a diffusion sheet structure using Janus material.

BACKGROUND OF INVENTION

Generally, liquid crystal display devices include liquid crystal display panels and backlight modules for providing light sources. The backlight modules include lamp tubes, light guide plates, reflective sheets, etc. The lamp tube is primarily for realizing a light emitting purpose, and the diffusion sheet primarily makes emitted light be uniformly diffused to each direction by several diffusion particles to improve uniformity of light distribution.

During a process of the backlight module continuously lighting up, the lamp tube heats up, which increases a temperature of the backlight module. Furthermore, the closer to the lamp tube, the more severe the heat, causing temperature of the liquid crystal display panel in an entire backlight plate to have temperature difference, and the temperature difference can be greater than 10° C., which results in poor display effect, such as local area whitening occurring on the liquid crystal display panel. This is because brightness of liquid crystals is different at different temperatures at a same voltage.

Therefore, a diffusion sheet structure is necessary to solve the technical problem present in prior art.

SUMMARY OF INVENTION

The purpose of the present disclosure is to solve the technical problem of poor display graphic occurrence, such as local area whitening occurring on the liquid crystal display panel.

In order to solve the technical problem mentioned above, one purpose of the present disclosure is to provide a diffusion sheet structure, which uses Janus material in a diffusion sheet to replace diffusion particles of prior art. In addition to retaining original function of diffusing light, it also has excellent thermal conductivity, thereby improving thermal uniformity, making the liquid crystal display panel be heated uniformly, and reducing influence of temperature on liquid crystal material during lighting, thereby solving the problem of local area whitening.

Based on the purpose mentioned above, the present disclosure provides a diffusion sheet structure including a transparent substrate and a diffusion film. The transparent substrate includes a first upper surface and a first lower surface. The diffusion film is disposed on the transparent substrate and includes a plurality of nano diffusion particles, and has a second upper surface and a second lower surface. The second lower surface is connected to the first upper surface. Further, light from a backlight module enters into the transparent substrate through the first lower surface and departs the transparent substrate through the first upper surface, and the light enters into the diffusion film through the second lower surface, and departs the diffusion film through the second upper surface, and the light irradiates on to the plurality of nano diffusion particles, and is then diffused, and the plurality of nano diffusion particles transmit thermal energy from the backlight module on the diffusion film.

Preferably, each of the nano diffusion particles further includes a first portion and a second portion. The first portion includes metal or carbon, and the second portion includes an organic matter.

Preferably, the diffusion film further includes a diffusion layer. The first portion forms the diffusion layer, and the diffusion layer includes the second upper surface.

Preferably, the diffusion film further includes an organic matter layer. The second portion forms the organic matter layer, and the organic matter layer includes the second lower surface. Intermolecular force is generated between the second lower surface and the first upper surface.

Preferably, each of the nano diffusion particles further includes a carrier. The carrier includes silicon or carbon. The first portion is disposed on a side of the carrier, and the second portion is disposed on another side of the carrier.

Preferably, the diffusion film further includes an organic matter layer and a carrier layer. The second portion forms the organic matter layer, and the organic matter layer includes the second lower surface. Intermolecular force is generated between the second lower surface and the first upper surface. The carriers form the carrier layer.

Preferably, a particle size of the plurality of nano diffusion particles is less than 20 nm.

Preferably, the plurality of nano diffusion particles include one or more of silver, gold, aluminum oxide, copper, tin, and carbon.

Preferably, the plurality of nano diffusion particles include a resin material.

Preferably, the plurality of nano diffusion particles are disposed on the transparent substrate by an ultrasonic spraying method.

Based on the purpose mentioned above, the present disclosure further provides a diffusion sheet structure including a transparent substrate and a diffusion film. The transparent substrate includes a first upper surface and a first lower surface. The diffusion film is disposed on the transparent substrate and includes a plurality of nano diffusion particles, and has a second upper surface and a second lower surface. The second lower surface is connected to the first upper surface. Further, each of the nano diffusion particles further includes a first portion, a second portion, and a carrier. The carrier includes silicon or carbon. The first portion is disposed on a side of the carrier, and the second portion is disposed on another side of the carrier. Further, light from a backlight module enters into the transparent substrate through the first lower surface and departs the transparent substrate through the first upper surface, and the light enters into the diffusion film through the second lower surface, and departs the diffusion film through the second upper surface, and the light irradiates on to the plurality of nano diffusion particles, and is then diffused, and the plurality of nano diffusion particles transmit thermal energy from the backlight module on the diffusion film.

Preferably, the first portion includes metal or carbon, and the second portion includes an organic matter.

Preferably, the diffusion film further includes a diffusion layer. The first portion forms the diffusion layer, and the diffusion layer includes the second upper surface.

Preferably, the diffusion film further includes an organic matter layer. The second portion forms the organic matter layer, and the organic matter layer includes the second lower surface. Intermolecular force is generated between the second lower surface and the first upper surface.

Preferably, the diffusion film further includes an organic matter layer and a carrier layer. The second portion forms the organic matter layer, and the organic matter layer includes the second lower surface. Intermolecular force is generated between the second lower surface and the first upper surface. The carriers form the carrier layer.

Based on the purpose mentioned above, the present disclosure further provides a diffusion sheet structure including a transparent substrate and a diffusion film. The transparent substrate includes a first upper surface and a first lower surface. The diffusion film is disposed on the transparent substrate and includes a diffusion layer, an organic matter layer and a plurality of nano diffusion particles, and having a second upper surface and a second lower surface, and the second lower surface is connected to the first upper surface. Further, each of the nano diffusion particles further includes a first portion and a second portion. The first portion forms the diffusion layer. The diffusion layer includes the second upper surface, and the second portion forms the organic matter layer. The organic matter layer includes the second lower surface. Intermolecular force is generated between the second lower surface and the first upper surface. Further, light from a backlight module enters into the transparent substrate through the first lower surface and departs the transparent substrate through the first upper surface, and the light enters into the diffusion film through the second lower surface, and departs the diffusion film through the second upper surface, and the light irradiates on to the plurality of nano diffusion particles, and is then diffused, and the plurality of nano diffusion particles transmit thermal energy from the backlight module on the diffusion film.

Preferably, the first portion includes metal or carbon, and the second portion includes an organic matter.

Preferably, a particle size of the plurality of nano diffusion particles is less than 20 nm.

Preferably, the plurality of nano diffusion particles include one or more of silver, gold, aluminum oxide, copper, tin, and carbon.

Preferably, the plurality of nano diffusion particles include a resin material.

The technical effect of the present disclosure is to use Janus material in a diffusion sheet to replace diffusion particles of prior art, which not only retains original function of diffusing light, but also has excellent thermal conductivity, thereby improving thermal uniformity, making the liquid crystal display panel be heated uniformly, and reducing influence of temperature on liquid crystal material during lighting, thereby solving the problem of local area whitening.

DETAILED DESCRIPTION OF PREFERRED EMBODIMENTS

Figure 1:
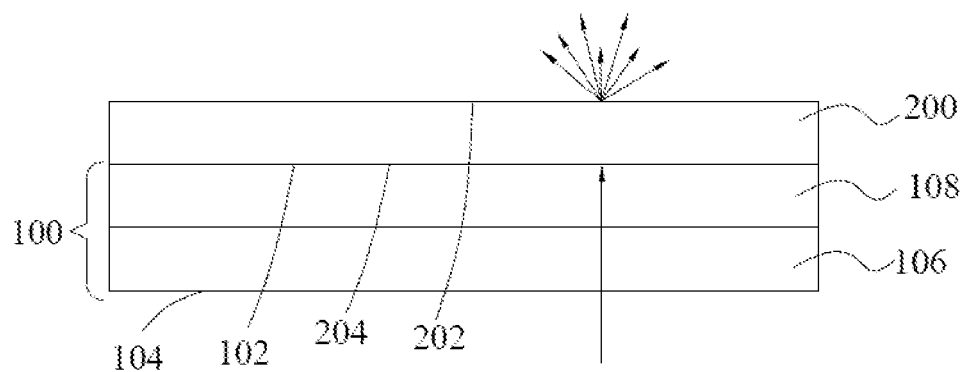
FIG. 1 is a first schematic diagram of a diffusion sheet structure of the present disclosure.

In order to allow the above and other purposes, features, and advantages of the present disclosure to be more obvious and easy to understand, preferred embodiments of the present disclosure will be particularly described hereinafter, and with reference to the accompanying drawings, a detailed description will be given below. Furthermore, directional terms described by the present disclosure, such as upper, lower, top, bottom, front, rear, left, right, inner, outer, side, circumference, center, horizontal, vertical, axial, radial, top layer, bottom layer, etc., are only directions by referring to the accompanying drawings. Therefore, the adopted directional terms are used to describe and understand the present disclosure, but the present disclosure is not limited thereto.

In the figures, units with similar structures are indicated by the same reference numerals.

Figure 2:
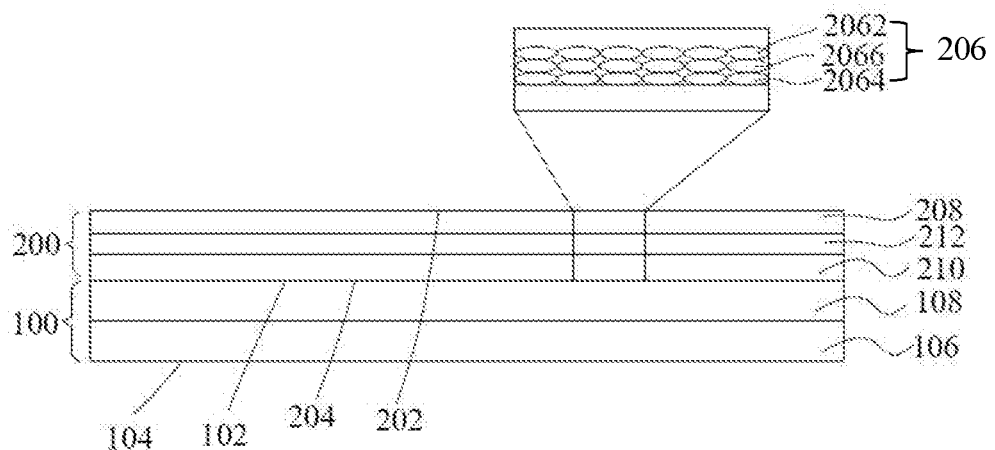
FIG. 2 is a second schematic diagram of the diffusion sheet structure of the present disclosure.
Figure 3:
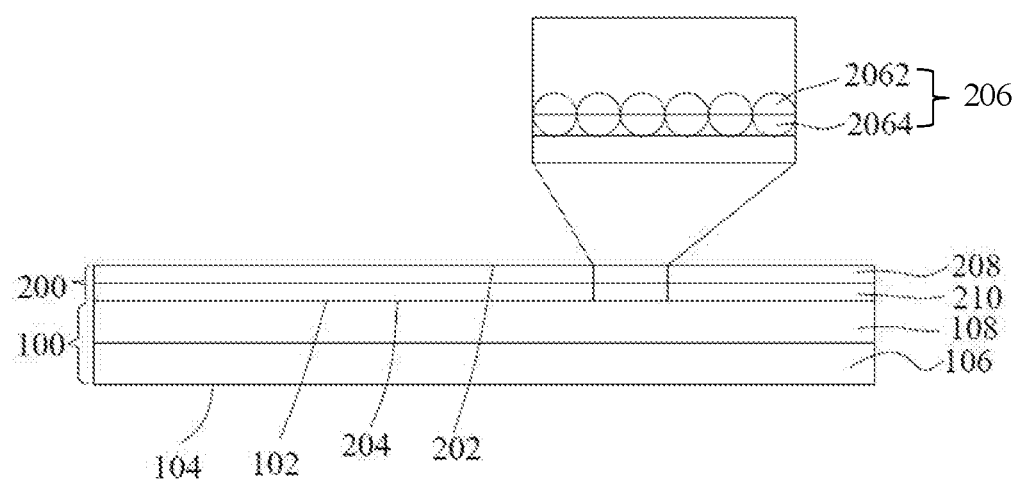
FIG. 3 is a third schematic diagram of the diffusion sheet structure of the present disclosure.

Please refer to FIG. 1 to FIG. 3, FIG. 1 to FIG. 3 area first to a third schematic diagrams of a diffusion sheet structure of the present disclosure. The diffusion sheet structure of the present disclosure includes a transparent substrate 100 and a diffusion film 200.

Furthermore, the transparent substrate 100 includes a first upper surface 102 and a first lower surface 104. In an embodiment, the transparent substrate 100 includes a scratch-resistant layer 106 and a light transparent layer 108. The light transparent layer 108 is disposed on the scratch-resistant layer 106.

In another embodiment, the light transparent layer 108 includes one or more of polyethylene terephthalate (PET), polystyrene (PS), poly(methyl methacrylate) (PMMA), polycarbonate (PC), transparent material, transparent plastic, and transparent glass, but is not limited thereto. The light transparent layer 108 can be constituted from various materials conducive to light penetration.

In addition, in an embodiment, the scratch-resistant layer 106 can include the first lower surface 104. By surface treatment or other curing methods to prevent scratching and reducing a penetration rate of light penetration, hardness of the first lower surface 104 of the scratch-resistant layer 106 can be increased. The scratch-resistant layer 106 includes one or more of PET, PS, PMMA, PC, transparent material, transparent plastic, and transparent glass, but is not limited thereto, The scratch-resistant layer 106 can be constituted from various materials conducive to light penetration.

The diffusion film 200 is disposed on the transparent substrate 100 and has a second upper surface 202 and a second lower surface 204. The second lower surface 204 is connected to the first upper surface 102. In addition, the diffusion film 200 includes a plurality of nano diffusion particles 206.

Light from a backlight module enters into the transparent substrate 100 through the first lower surface 104 and departs the transparent substrate 100 through the first upper surface 102, and the light enters into the diffusion film 200 through the second lower surface 204, and departs the diffusion film 200 through the second upper surface 202; the light irradiates on to the plurality of nano diffusion particles 206, and is then diffused, and the plurality of nano diffusion particles 206 transmit thermal energy from the backlight module on the diffusion film 200. Furthermore, the backlight module can be an edge type backlight module or a direct type backlight module, and is not limited thereto.

In an embodiment, a particle size of each of the plurality of nano diffusion particles 206 of the present disclosure is greater than 0 nm and less than 20 nm, and can be prepared by a chemical deposition method. Because the nano diffusion particles 206 have a very small particle size, they can have a larger surface area than general materials, so that heat energy can be transferred more easily, and in particular, can transmit heat energy in the diffusion film 200 by a heat conduction way, making temperature distribution on the diffusion film 200 be uniform and reducing temperature difference.

In an embodiment, the plurality of nano diffusion particles 206 include material that can contribute to heat transfer, such as one or more of silver, gold, aluminum oxide, copper, tin, and carbon, to make temperature distribution on the diffusion film 200 be uniform and reduce temperature difference.

In an embodiment, the plurality of nano diffusion particles 206 can be disposed on the transparent substrate 100 by an ultrasonic spraying method, but is not limited thereto. For example, the plurality of nano diffusion particles 206 can be directly coated on the transparent substrate 100, and then forming a uniform film material by a knife-coating method, then, forming the diffusion film 200.

In an embodiment, each of the nano diffusion particles 206 further includes a first portion 2062, a second portion 2064, and a carrier 2066. The first portion 2062 includes metal or carbon, and the second portion 2064 includes an organic matter. The carrier 2066 includes silicon or carbon. The first portion 2062 is disposed on a side of the carrier 2066, and the second portion 2064 is disposed on another side of the carrier 2066.

Furthermore, the diffusion film 200 further includes a diffusion layer 208 and an organic matter layer 210. The first portion 2062 forms the diffusion layer 208. The diffusion layer 208 includes the second upper surface 202. The second portion 2064 forms the organic matter layer 210. The organic matter layer 210 includes the second lower surface 204. Intermolecular force is generated between the second lower surface 204 and the first upper surface 102. The carriers 2066 form a carrier layer 212.

Furthermore, as illustrated in FIG. 2, each of the nano diffusion particles 206 can be a Janus particle. Therefore, the nano diffusion particles 206 can be a special type of nano particles consisting of two or more components of different physical properties, so that two different types of chemical properties are present on a same particle. In this embodiment, an organic functional group of the second lower surface 204 of the diffusion film 200 can be modified to form a good bond with the transparent substrate 100, so that the diffusion film 200 is not easily peeled off, and stability of the diffusion sheet structure is improved.

The nano diffusion particles 206 of the present disclosure can be prepared by various preparation methods; for example, they can be prepared by a microfluidic synthesis method, a topology selection surface modification method, a template self-assembly method, a controllable phase separation method, a controllable surface nucleation method, a chemical deposition method, etc. In this embodiment, the first portion 2062, such as silver nanoparticles, may be first formed on the carrier 2066, such as silicon balls, and then forming a film sheet by an ultrasonic spraying method, then modifying the lower surface with an organic material to form the second portion 2064 to obtain the designated organic matter layer 210.

Furthermore, material having good thermal conductivity such as aluminum oxide ($Al_2O_3$), gold (Au), carbon (such as graphene), etc. can be used on the first portion 2062 of the nano diffusion particles 206. Material such as a resin material of the second portion 2064 of the nano diffusion particles 206 may be selected from material having good adhesion to the lower transparent substrate 100, such as polyethylene terephthalate, which allows intermolecular force, such as secondary bond, Van der Waals force, etc. to be generated between the second lower surface 204 and the first upper surface 102 to make the diffusion film 200 be not easily peeled off, and the stability of the diffusion sheet structure is improved.

In another embodiment, as illustrated in FIG. 3, which may also not include carriers 2066, each of nano diffusion particles 206 further includes a first portion 2062 and a second portion 2064. The first portion 2062 includes metal or carbon, and the second portion 2064 includes an organic matter. A diffusion film 200 further includes a diffusion layer 208 and an organic matter layer 210. The first portion 2062 forms the diffusion layer 208. The diffusion layer 208 includes a second upper surface 202. The second portion 2064 forms the organic matter layer 210. The organic matter layer 210 includes a second lower surface 204. Intermolecular force is generated between the second lower surface 204 and a first upper surface 102.

Furthermore, as illustrated in FIG. 3, each of the nano diffusion particles 206 can be a Janus particle. Therefore, the nano diffusion particles 206 can be a special type of nano particles consisting of two or more components of different physical properties such that two different types of chemical properties are present on a same particle. In this embodiment, an organic functional group of the second lower surface 204 of the diffusion film 200 can be modified to form a good bond with a transparent substrate 100, so that the diffusion film 200 is not easily peeled off, and the stability of the diffusion sheet structure is improved.

Nano diffusion particles 206 of the present disclosure can be prepared by various preparation methods; for example, they can be prepared by a microfluidic synthesis method, a topology selection surface modification method, a template self-assembly method, a controllable phase separation method, a controllable surface nucleation method, a chemical deposition method, etc. In this embodiment, the first portion 2062, such as silver nanoparticles, can be directly formed, and then forming a film sheet by an ultrasonic spraying method, then modifying the lower surface with an organic material to form the second portion 2064 to obtain the designated organic matter layer 210.

Furthermore, material having good thermal conductivity such as aluminum oxide ($Al_2O_3$), gold (Au), carbon (such as graphene), etc can be used on the first portion 2062 of the nano diffusion particles 206. Material such as a resin material of the second portion 2064 of the nano diffusion particles 206 may be selected from material having good adhesion to the lower transparent substrate 100, such as polyethylene terephthalate, which allows intermolecular force, such as secondary bond, Van der Waals force, etc. to be generated between the second lower surface 204 and the first upper surface 102 to make the diffusion film 200 be not easily peeled off, and the stability of the diffusion sheet structure is improved.

In summary, Janus material in a diffusion sheet is used in the present disclosure to replace diffusion particles of prior art, which not only retains original function of diffusing light, but also has excellent thermal conductivity, thereby improving thermal uniformity, making the liquid crystal display panel be heated uniformly, and reducing influence of temperature on liquid crystal material during lighting, thereby improving the problem of local area whitening.

Also, although the disclosure has been shown and described with respect to one or more implementations, equivalent alterations and modifications will occur to others skilled in the art based upon a reading and understanding of this specification and the annexed drawings. The disclosure includes all such modifications and alterations, and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The above are preferred embodiments of the present disclosure. It should be noted that those skilled in the art can further make many changes and modifications without departing from the technical theory of the present disclosure, and the changes and the modifications should be considered as the scope of protection of the present disclosure.

What is claimed is:

1. A diffusion sheet structure, comprising:
    a transparent substrate, comprising a first upper surface and a first lower surface; and
    a diffusion film disposed on the transparent substrate and comprising a plurality of nano diffusion particles and having a second upper surface and a second lower surface, and the second lower surface is connected to the first upper surface;
    wherein light from a backlight module enters into the transparent substrate through the first lower surface and departs the transparent substrate through the first upper surface, and the light enters into the diffusion film through the second lower surface and departs the diffusion film through the second upper surface, and the light irradiates on to the plurality of nano diffusion particles, and is then diffused, and the plurality of nano diffusion particles transmit thermal energy from the backlight module on the diffusion film;
    wherein each of the nano diffusion particles further comprises a first portion and a second portion;
    the first portion comprises metal or carbon, and the second portion comprises an organic matter
    wherein each of the nano diffusion particles further comprises a carrier;
    the carrier comprises silicon or carbon;
    the first portion is disposed on a side of the carrier, and the second portion is disposed on another side of the carrier;
    wherein the diffusion film further comprises an organic matter layer and a carrier layer; the second portion forms the organic matter layer, and the organic matter layer comprises the second lower surface;
    intermolecular force is generated between the second lower surface and the first upper surface; and
    the carrier forms the carrier layer.

2. The diffusion sheet structure as claimed in claim 1, wherein the diffusion film further comprises a diffusion layer; the first portion forms the diffusion layer, and the diffusion layer comprises the second upper surface.

3. The diffusion sheet structure as claimed in claim 1, wherein a particle size of the plurality of nano diffusion particles is less than 20 nm.

4. The diffusion sheet structure as claimed in claim 1, wherein the plurality of nano diffusion particles comprise one or more of silver, gold, aluminum oxide, copper, tin, and carbon.

5. The diffusion sheet structure as claimed in claim 1, wherein the plurality of nano diffusion particles comprise a resin material.

6. The diffusion sheet structure as claimed in claim 1, wherein the plurality of nano diffusion particles are disposed on the transparent substrate by an ultrasonic spraying method.

7. A diffusion sheet structure, comprising:
    a transparent substrate, comprising a first upper surface and a first lower surface; and
    a diffusion film disposed on the transparent substrate and comprising a plurality of nano diffusion particles and having a second upper surface and a second lower surface, and the second lower surface connected to the first upper surface;
    wherein each of the nano diffusion particles further comprises a first portion, a second portion, and a carrier;
    the carrier comprises silicon or carbon;
    the first portion is disposed on a side of the carrier, and the second portion is disposed on another side of the carrier;
    wherein light from a backlight module enters into the transparent substrate through the first lower surface and departs the transparent substrate through the first upper surface, and the light enters into the diffusion film through the second lower surface and departs the diffusion film through the second upper surface, and the light irradiates on to the plurality of nano diffusion particles, and is then diffused, and the plurality of nano diffusion particles transmit thermal energy from the backlight module on the diffusion film;
    wherein the first portion comprises metal or carbon, and the second portion comprises an organic matter
    wherein the diffusion film further comprises an organic matter layer and a carrier layer; the second portion forms the organic matter layer, and the organic matter layer comprises the second lower surface;
    intermolecular force is generated between the second lower surface and the first upper surface; and
    the carrier forms the carrier layer.

8. The diffusion sheet structure as claimed in claim 7, wherein the diffusion film further comprises a diffusion layer; the first portion forms the diffusion layer, and the diffusion layer comprises the second upper surface.

9. A diffusion sheet structure, comprising:
    a transparent substrate, comprising a first upper surface and a first lower surface; and
    a diffusion film disposed on the transparent substrate and comprising a diffusion layer, an organic matter layer, and a plurality of nano diffusion particles, and having a second upper surface and a second lower surface, and the second lower surface is connected to the first upper surface;
    wherein each of the nano diffusion particles further comprises a first portion and a second portion; the first portion forms the diffusion layer; and the diffusion layer comprises the second upper surface, and the second portion forms the organic matter layer, and the organic matter layer comprises the second lower surface; intermolecular force is generated between the second lower surface and the first upper surface;
    wherein light from a backlight module enters into the transparent substrate through the first lower surface and departs the transparent substrate through the first upper surface, and the light enters into the diffusion film through the second lower surface and departs the diffusion film through the second upper surface, and the light irradiates on to the plurality of nano diffusion particles, and is then diffused, and the plurality of nano diffusion particles transmit thermal energy from the backlight module on the diffusion film;

the first portion comprises metal or carbon, and the second portion comprises an organic matter wherein each of the nano diffusion particles further comprises a carrier;

the carrier comprises silicon or carbon;

wherein the diffusion film further comprises the organic matter layer and a carrier layer; and the carrier forms the carrier layer.

10. The diffusion sheet structure as claimed in claim 9, wherein a particle size of the plurality of nano diffusion particles is less than 20 nm.

11. The diffusion sheet structure as claimed in claim 9, wherein the plurality of nano diffusion particles comprise one or more of silver, gold, aluminum oxide, copper, tin, and carbon.

12. The diffusion sheet structure as claimed in claim 9, wherein the plurality of nano diffusion particles comprise a resin material.

\* \* \* \* \*